[19] United States Patent
Chiba et al.

[11] Patent Number: 5,045,866
[45] Date of Patent: Sep. 3, 1991

[54] IMAGE PRINTING DEVICE

[75] Inventors: Kazuhiro Chiba; Noriko Bamba, both of Kyoto, Japan

[73] Assignee: Mitsubishi Denki Kabushiki Kaisha, Tokyo, Japan

[21] Appl. No.: 530,748

[22] Filed: Jul. 6, 1990

Related U.S. Application Data

[62] Division of Ser. No. 317,284, Feb. 28, 1989, Pat. No. 4,959,663.

[30] Foreign Application Priority Data

Feb. 29, 1988 [JP] Japan .................................. 63-47333
Apr. 11, 1988 [JP] Japan .................................. 63-88527

[51] Int. Cl.⁵ ........................ G01D 15/10; G03G 5/16
[52] U.S. Cl. ............................. 346/76 PH; 346/76 L; 346/76 R; 250/316.1
[58] Field of Search .............. 346/76 PH, 76 L, 76 R; 250/316.1

[56] References Cited

U.S. PATENT DOCUMENTS 4,525,722  6/1985  Sachdev et al. ............... 346/76 PH
4,959,663  9/1990  Chiba et al. ................... 346/76 PH Primary Examiner—Benjamin R. Fuller
Assistant Examiner—Gerald E. Preston

[57] ABSTRACT

An image printing device in which desired images represented by two or more valued data are recorded with a laser beam. This image printing device allows to employ a semiconductor laser which is relatively low in an output power resulting in reducing manufacturing cost and prolonging a service life of the device.

18 Claims, 3 Drawing Sheets

IMAGE PRINTING DEVICE

This application is a divisional of copending application Ser. No. 07/317,284, filed on Feb. 28, 1989, now U.S. Pat. No. 4,959,663.

BACKGROUND OF THE INVENTION

This invention relates to an image printing device in which desired images represented by two or more valued data are recorded with a laser.

Recently, methods of printing images with a laser, and apparatuses for practicing the methods have been actively developed, and a number of patent applications have been filed therefor. Among those patent applications, Japanese Patent Application (OPI) No 291184/1986 should be taken into consideration (the term "OPI" as used herein means an "unexamined published application").

FIG. 1 is a diagram outlining the laser printing method disclosed by the above mentioned Japanese Patent Application. In FIG. 1, reference numeral 101 designates a support; 102, a heat generating layer; 103, a leuco dye layer; 104, a developer-contained image receiving layer; 105, an image receiving base; and, 100, a laser beam converged to have a predetermined beam diameter and intensity-modulated according to the image signal. The support 101, the heat generating layer 102 and the dye layer 103 form a transferring sheet 300. The image receiving layer 104 and the image receiving base 105 form an image receiving sheet 400.

The coloring operation thereof will be described. The laser beam 100, which has been intensity-modulated according to the image signal and converged to have a predetermined beam diameter is applied through the support 101 made of a transparent film to the heat generating layer 102. As a result, the heat generating layer 102 generates heat through light absorption according to the energy of the laser beam 100. The dye of the leuco dye layer 103 is transferred over to the developer-contained image receiving layer 103 of the image receiving sheet by the heat thus generated. The dye and the developer react with each other, thus coloring, as a result of which the image is formed. This operation is continuously carried out to obtain a two-dimensional recorded image.

The coloring operation is as outlined above. The apparatus further includes: laser beam scanning device; laser beam modulating means, memory device for storing image signals to be modulated device for abutting the transferring sheet and the image receiving against each other, device for conveying these sheets and device for synchronizing the operations of the device described above. The apparatus has been disclosed, for instance, by Japanese Patent Application (OPI) No's 8949/1976, 128277/1987, 159973/1987, and 108669/1987.

The conventional image printing method using a laser is as described above. That is, the generation of heat depends fully on the energy of the laser beam. Therefore, the conventional method suffers from a problem that an expensive high-power laser must be employed. For instance, the laser output 0.5 W described in the specification of the above-described Japanese Patent Application (Laser Printing Method) is 100 times as high as the output 5 mW of a semiconductor laser which is most generally employed for compact disc players or the like. In addition, it is expensive, and is relatively short in service life.

SUMMARY OF THE INVENTION

Accordingly, an object of the present invention is to eliminate the above-described difficulties accompanying a conventional image printing device using a laser. More specifically, an object of the present invention is to provide an image printing device using a laser in which images can be recorded with a lower power laser, and a semiconductor laser low in manufacturing cost and long in service life can be used.

With an image printing device according to the invention, its head includes a support, a film resistor formed on the support which reacts on at least one of the heat generation effect and photoconductive effect of a laser beam, and electrodes for supplying electric power to the film resistor. It further includes a laser beam intensity-modulated according to the image signal which is applied to the film resistor to change the resistance of the latter, so that the image printing operation is carried out with the heat corresponding to the resistance thus changed.

DESCRIPTION OF THE PREFERRED EMBODIMENTS

Preferred embodiments of this invention will be described with reference to the accompanying drawings.

Figure 2:
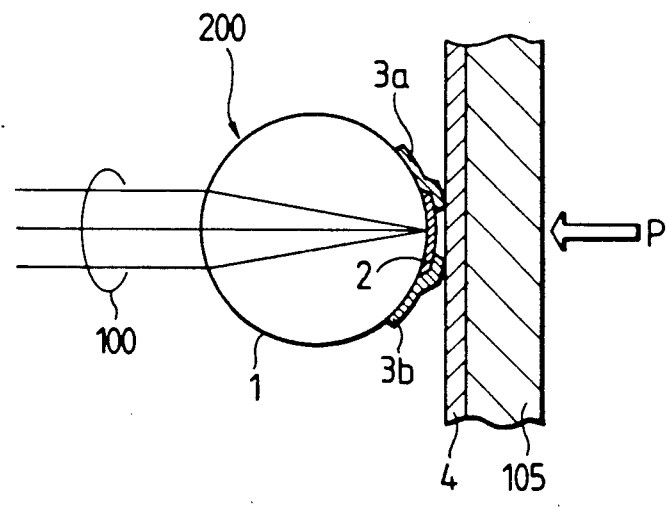
FIG. 2 is an explanatory diagram showing one embodiment of this invention which is applied to an image printing operation with a thermal printing sheet.

FIG. 2 is a sectional view showing essential components of an image printing device using a laser, which is one embodiment of the present invention. In FIG. 2, reference numeral 1 designates a glass support which is in the form of a rod to converge a laser beam; 2, a film resistor formed on the glass support 1; 3a and 3b; a first electrode and a second electrode, respectively, which are connected to a voltage source (not shown), the glass support 1, the film resistor 2 and the electrodes 3a and 3b forming a head 200; and 4, a thermal dye layer formed on the image receiving base 105.

In operation, a laser beam 100 having a predetermined beam diameter, which is generated by a laser beam generating device (not shown) and intensity-modulated according to an image signal, is applied through the glass support 1 to the film resistor 2. Owing to the heat generation effect or photoconductive effect of the laser beam, the part of the film resistor to which the laser beam is applied is decreased spot-wise in resistance. In this operation, a voltage V is applied to the film resistor 2 through the first and second electrode 3a and 3b, as a result of which heat is generated in a spotshaped part of the film resistor in proportion to the electric power (P) as defined below:

$$P = V^2/r$$

where r is the composite resistance including the resistance of the parts around the laser-applied part of the film resistor. This heat, being concentrated substantially at the center of the laser beam applied, is transmitted to the thermal dye layer 4 formed on the image receiving base 105, so that coloring occurs with a density corresponding to the heat. In this case, similarly as in the conventional image printing device, the image receiving base 105 is pushed against the glass support 1 under a predetermined pressure by using for instance a platen, for the purpose of improving the heat utilization efficiency.

The above-described operation is carried out in combination with a conventional printer technique using laser scanning means and sheet running means (both not shown), to record the desired image.

Figure 3:
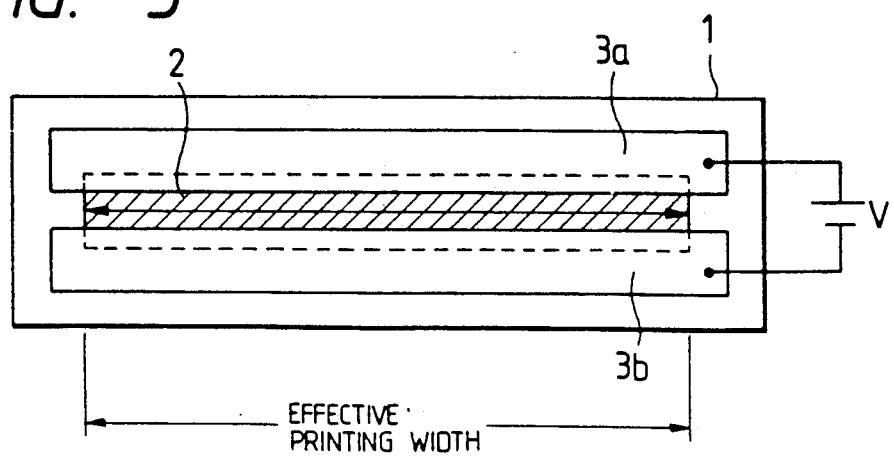
FIG. 3 is a front view outlining a heat generating section in FIG. 2.

FIG. 3 is a front view of the glass support 1. As shown in FIG. 3, the film resistor 2 is uniformly formed on the glass support as much as an effective record width, and the electrodes 3a and 3b are so formed as to uniformly apply a voltage V to the film resistor 2.

Therefore, the printing of a line can be achieved by scanning the central portion (indicated by the long arrow "◀──▶") of the film resistor 2 with the modulated laser beam.

The film resistor 2 will uniformly generate heat with electric power $P = V^2/R$ (where R is the whole resistance of the film resistor 2), and therefore it can be used a device for heating the head. However, since the resistance changes with temperature or light quantity, it is necessary to provide a control device for changing the voltage V to maintain the temperature constant.

Figure 4A:
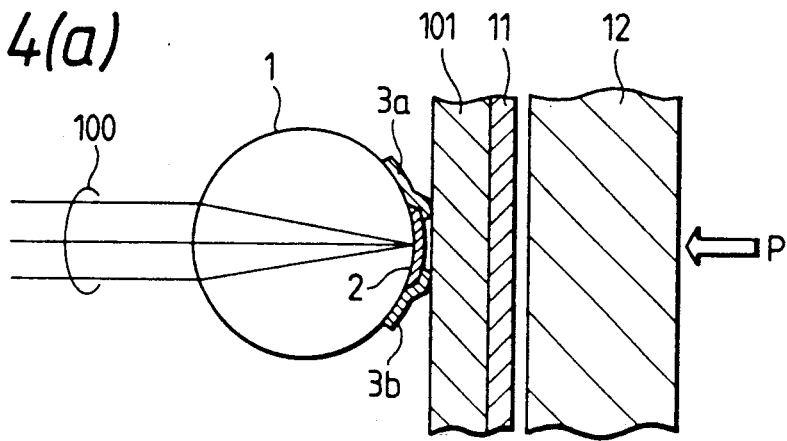
FIGS. 4(a) & 4(b) are a composite explanatory diagram showing another embodiment of the invention which is applied to a sublimated dye thermal transfer system.
Figure 4B:
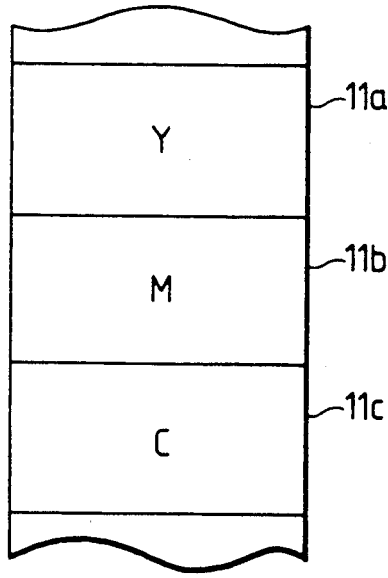

FIGS. 4(a) and 4(b) show another embodiment of the invention, in which a full color printing operation is carried out. More specifically, FIG. 4(a) is a side view thereof, and FIG. 4(b) is an explanatory diagram showing one example of an ink film which is generally used. In FIG. 4(a), reference numeral 11 designates a thermal sublimated dye layer formed on a support 101 of film or the like; and 12, an image receiving sheet the surface of which is specially treated. The other parts are the same as those in FIG. 2. The sublimated dye layer 11, as shown in FIG. 4(b), is made up of three fundamental colors, yellow 11a, magenta 11b' and cyan 11c, and the RECORDING operation is carried out in the stated, surface order.

The coloring operation in the second embodiment is carried out in the same way as that in the first embodiment shown in FIG. 2. The laser beam 100 having a predetermined beam diameter, which is intensity-modulated according to the image, is applied through the glass support 1 to the film resistor 2. In response to the optical intensity of the laser beam, the laser-irradiated part of the resistor is decreased in resistance. As a result of the decrease of the resistance, with a power consumption $V^2/r$ (r is the composite resistance after the laser beam application) heat is generated. The heat thus generated is transmitted to the support 101 to cause the sublimated dye 11 on the other side of the support 101 to thermally transfer on to the image receiving sheet 12. This thermal dye transfer is carried out for each of the inks, three times. Thus, the full color printing operation has been accomplished.

Now, the film resistor 2 will be described in more detail. If the film resistor 2 is of the material which does not react on the heat generation effect or photoconductive effect of a laser beam, similarly as in the prior art, it is necessary to use a high power laser. Therefore, the invention is based on the fact that the film resistor is partially or in its entirety made of a material which will react to such an effect (hereinafter referred to as "sensitive material", when applicable). One example of the material which reacts upon the heat generation effect of a laser beam is that of a negative (or positive) thermal sensitivity resistor (having a trade name "Thermistor", or "Posistor"). One example of the material which reacts upon the photoconductive effect of a laser beam is that of a photosensitive resistor. These materials are as described in general electronics material publications, and the resistance thereof, similarly as in the case of a semiconductor, changes with the square of temperature or light quantity. That is, as the temperature or light quantity increases slightly, the resistance is abruptly increased, thus accelerating the generation of heat. This heat generation is advantageous in that the object can be achieved even when the energy of the laser beam is decreased with the beam diameter decrease, and it is effective especially in a general printing operation in which each picture element is at least 100 $\mu m^2$ in area.

The film resistor 2 may be formed by partially doping for instance carbon black which efficiently converts laser beam into heat, ordinary insensitive material (such as $SiO_2$ or NiCr used for thermal heads) or sensitive material in an ordinary resistor or laminating it thereon. The film resistor 2 should be formed by taking the following factors into consideration, the voltage V (which should be not higher than 10 V), long stability (against oxidation or the like), long service life having high heat resistance (the film resistor should be used for the printing of at least 10,000 sheets), manufacturing cost, operating speed, composite resistance, and security for human body. The configuration, materials and material blending should be suitably selected for the formation of the film resistor.

With the image printing device of the invention, the gradation is as follows. With the time of printing a picture element made constant, the gradation depends on the optical intensity which can be continuously changed by the laser drive current. That is, a continuous gradation characteristic is obtained.

The resolution is limited only by the laser beam diameter. Accordingly, the resolution which is substantially equivalent to that of photographs can readily obtained.

In the above-described embodiments, the glass support 1 is in the form of a round rod. However, the invention is not limited thereto or thereby. That is, the glass support 1 may be different in configuration from that shown. In addition, the material of the support 1 is not limited to glass only that is, it may be made of transparent plastic material (which is high in heat resistance).

The technical concept of the invention may be applied not only to the thermal printing system or sublimated dye thermal transfer system but also to a wax type thermal transfer system or other thermal printing systems.

As was described above, in the first and second embodiments of the present invention, the film resistor employed generates heat in response to the laser beam applied thereto and changes its resistance according to the intensity of the laser beam, and the device for supplying printing-heat generating power to the film resistor is provided. That is, the printing heat is generated by the film resistor, and the laser beam is used for controlling the generation of heat. Therefore, the image printing device needs no high power laser, and it is low in manufacturing cost and excellent both in resolution and in gradation. In addition, the image printing device can perform not only a color image printing operation but also a monochromatic image printing operation.

Figure 5:
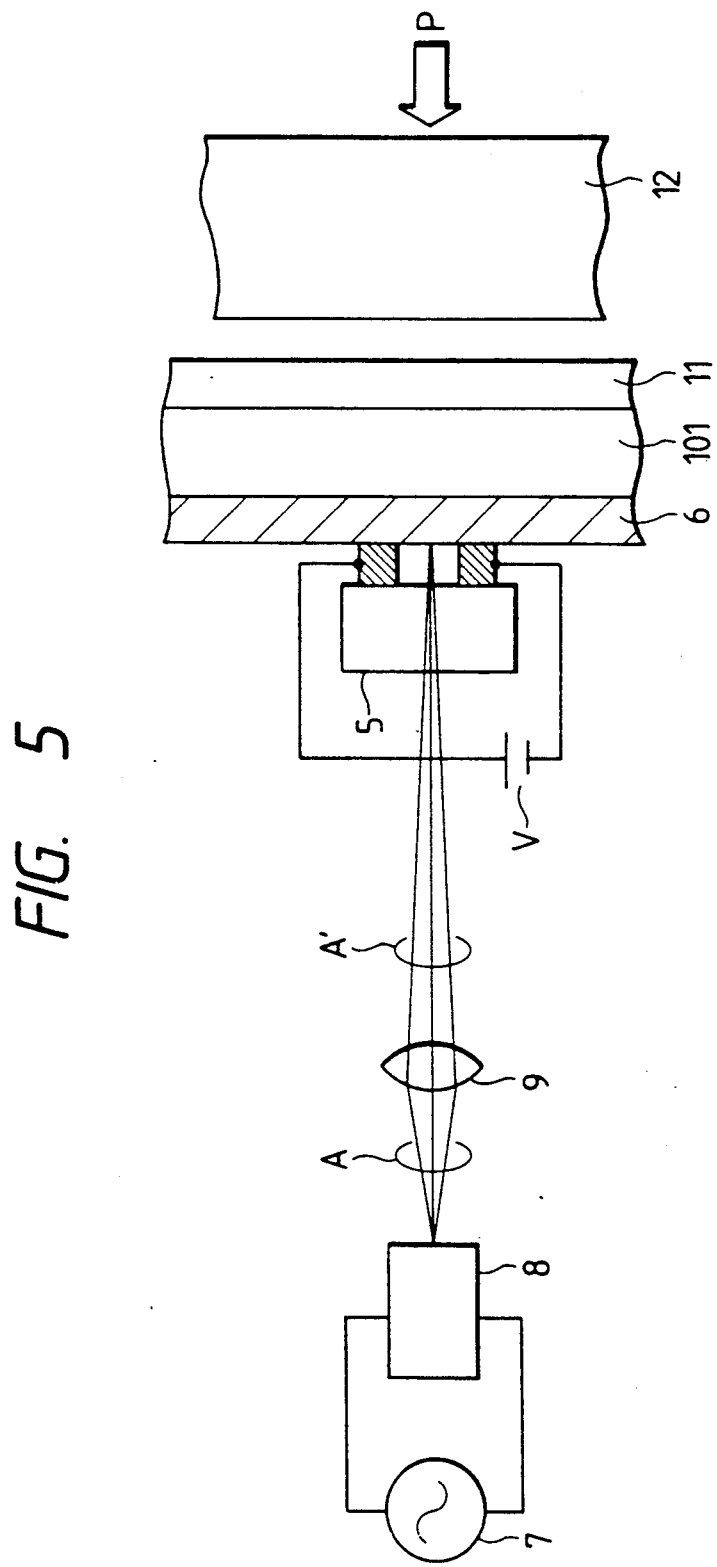
FIG. 5 is an explanatory diagram outlining the arrangement of a coloring section in an image printing device according to this invention.

Further, FIG. 5 shows the other embodiment of an image printing device according to the present invention. In FIG. 5, reference numeral 7 designates a laser modulator for modulating the optical intensity of a laser beam according to an image signal; 8, a laser generator; 9, a converging lens; 4, a voltage source for supplying a voltage V; 5, an abutting electrode means; 6, a heat generating layer; 11, a sublimated dye layer formed on a support 101, and 12, an image receiving sheet whose image receiving surface is so processed as to receive sublimated dye. The remaining components are similar to those in the conventional image printing device described before.

The operation of the image printing device thus organized will be described. The laser modulator 7 generates a drive current i according to the image signal represented by two or more valued data, and the laser generator 8 outputs a laser beam A whose optical intensity corresponds to the drive current i thus generated. The laser beam A is converged by the lens 9 into a laser beam A' which forms a light spot several tens of microns ($\mu$m) in diameter on an object. The voltage source 4 provides the voltage V as was described above, and it is connected to the two electrode of the abutting electrode device 5 to provide the voltage V across these electrodes. The two electrodes of the abutting electrode device 5 are brought into close contact with the heat generating layer 6 formed on the support 101 which is made up of a thin film. The heat generating layer 6, containing a material which reacts on a laser beam to decrease its resistance, provides a resistance r corresponding to the optical intensity of the laser beam. That is, the heat generating layer 6 will generate heat according to the following expression:

$P = V^2/r.$

The heat is transmitted through the support 101 to heat the sublimated dye layer 11 formed on the other side of the support 101. As a result, the sublimated dye 11 is transferred onto the image receiving sheet according to the amount of heat. Thus, the printing of one position (point) has been accomplished. This operation is carried out for other positions, to achieve the printing of one line. The line printing operation is repeated a predetermined number of times, to accomplish the two-dimensional image printing operation. In this operation, scanning means (not shown) is operated to deflect the laser beam, in a scanning mode, between the two electrodes of the abutting electrode means 5. A platen or the like is used to apply a predetermined pressure to the image receiving sheet 12 from behind, in order to allow the image receiving sheet 12 to sufficiently contact with the sublimated dye layer 11 to thereby improve the thermal efficiency. In addition, a line shifting mechanism is necessary; however, it may be a conventional one.

Figure 6:
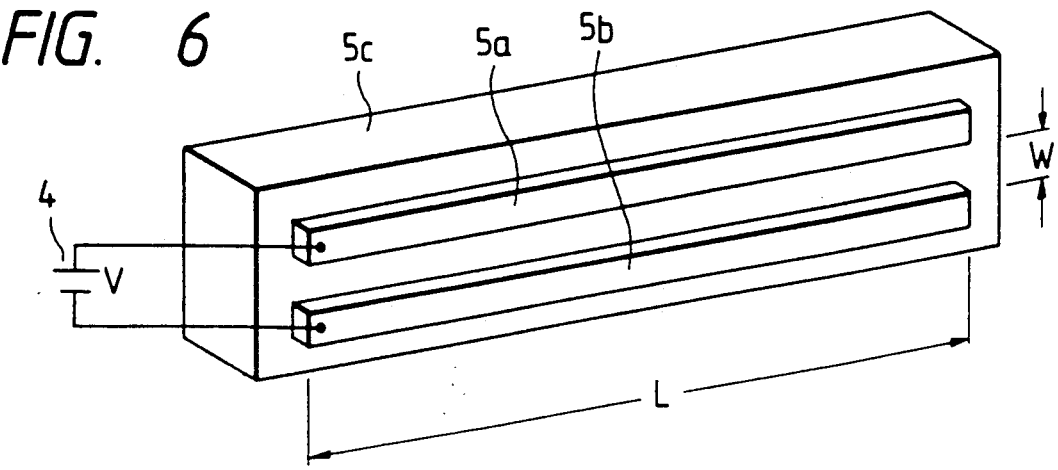
FIG. 6 is a perspective view of abutting electrode device 5 shown in FIG. 1.

FIG. 6 is a perspective view of the abutting electrode device 5. The abutting electrode device 5, as shown in FIG. 6, includes a support 5c of transparent plastic material or the like and two electrodes 5a and 5b formed on the support 5c in such a manner that the electrodes 5a and 5b are L in length, and are spaced from each other by W. The gap W, depending on a desired image resolution, is generally of the order of 200 $\mu$m to 50 $\mu$m. The length L corresponds to an effective printing width. The two electrodes 5a and 5b are connected to the voltage source 4. That is, the abutting electrode device 5 is simple in construction as described above.

Now, the heat generating layer will be described. A conventional heat generating layer is formed of a photo-thermal conversion material which absorbs light to produce heat, such as carbon black, graphite, phthalocyanine pigment, metal powder or metal oxide powder. It needs a high power laser because the printing heat depends fully on the photo-thermal conversion. On the other hand, in the invention, the heat generating layer is formed of the material whose resistance decreases with temperature or optical intensity.

First, the temperature thereof will be described. A negative thermal sensitivity resistor, called "thermistor", is available which reacts sensitively on temperature change to change its resistance (being formed by sintering the mixture of oxides of metals such as Cr, Mn, Fe, Co, Ni, Cu and Al). The resistance of the material changes exponentially, and it will show a resistance of the order of one digit with temperatures of several tens of degrees. That is, when a temperature of several tens of degrees is provided by the photo-thermal conversion of the laser beam, then according to the spot configuration of the laser beam, the resistance of the irradiated part is changed. Further, when, in this case, the voltage V is applied across the resistance, then heat is generating accord to the power $P = V^2/r$ (where r is the composite resistance provided after the irradiation). This heat can be used for the image printing operation. Thus, the image printing operation can be achieved with a small laser output.

Now, a light sensitive resistor will be described. There are a variety of available material whose resistance varies in response to variation in the quantity of light. It is called "a photo-conductive material" (such as CdS, CdSe, PbS and PbSe). When a voltage V is applied to a photo-conductive material irradiated with a light beam having a luminance L, then a photocurrent (I) which is expressed as follows, flows there through:

$I = \alpha \cdot V^{\beta} \cdot L^{\gamma}$ where $\beta \approx 1$, $0.5 < \gamma < 1.0$, and $\alpha$ is the constant. If, in this case, the resistance is R, then heat is generated according to the electric power $P = R \cdot I^2 = R \cdot \alpha^2 \cdot V^{2\beta} \cdot L^{2\gamma}$. According to the expression, $1 < 2\gamma < 2.0$. That is, super-linear power or head is generated with linear optical intensity change L. In other words, the electric power changes greatly with a small amount of change in the quantity of light. Therefore, a low power laser can be utilized. Thus, the image printing operation can be carried out by using photo-conductive materials.

The above-described materials are relatively expensive, thus being disadvantageous in that, if only one of the material is used, an image printing cost per image receiving sheet will be considerably high. Therefore, the heat generating layer may be formed by using the mixture which contains carbon essentially which is low in price, and the particles of at least one of the temperature sensitive resistor and photo sensitive resistor. In this case, since carbon is generally used for formation of resistors, the heat generating layer can have a desired resistance. Accordingly, if a predetermined voltage V is applied even if the laser beam is zero in the quantity of light, heat is generated with the electric power of $P=V^2/R$ (where R is the composite resistance between the electrodes). This may be utilized as image-transferring-sheet preheating device, and thus and contributes to the use of a low power laser.

Figure 1:
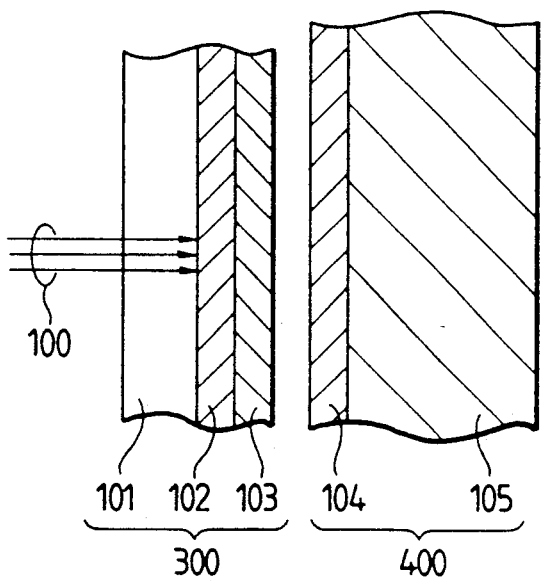
FIG. 1 is an explanatory diagram for a description of a conventional printing method using a laser.

Next, the structure of the image transferring sheet will be described. The conventional imager transferring sheet includes: as shown in FIG. 1, the film support 101, the heat generating layer 103 and the Leuco dye layer 102 which are formed on the support 101 in the stated order. The structure will improve the thermal efficiency thereof. However, it may be considered that a thermal image transfer is caused by the mixing of the Leuco dye and the material of the heat generating layer as the case may be. This difficulty cannot be disregarded in a color imager printing operation. In order to eliminate the difficulty, in the present invention, the heat generating layer 6 is formed on the light-projected side of the film support 101, and the sublimated dye layer 11 is formed on the opposite side thereof.

In the above-described embodiment, the abutting electrode device 5 is made up of the support 5c and the two electrodes 5a and 5b formed on the latter 5c. However, it may be modified as will be subsequently described. Two semi-circular metals arranged with a predetermined gap therebetween are used as the electrodes, or two electrodes are formed on a glass rod of predetermined material with a predetermined gap therebetween. In the latter modification, the glass rod can be used as a condenser lens.

If the sublimated dye layer of the transferring sheet is formed of a black coloring dye only, then a monochromatic image printing operation can be carried out. Further, if four sublimated dyes including a yellow, magenta and cyan sublimated dye and a black sublimated dyes are used successively, then a full color image printing operation can be performed.

Furthermore, if a mixture of sublimated dyes, pigments and wax is prepared, then a wax thermal transfer type image printing operation can be carried out. That is, the technical concept of the invention is applicable to all of the thermal image printing methods.

As was described above, in the image printing device according to the invention, the heat generating layer contains the material which reacts on a laser beam to change its resistance, and the device for applying a voltage to the heat generating layer is provided. Therefore, the heat generating layer generates the printing heat as Joule heat, and the laser beam can be used for heat control. Thus, the image printing device of the invention is operated with a low power laser, and is low in manufacturing cost and excellent both in gradation and in resolution.

What is claimed is:

1. An image printing system using a laser, comprising:
   an image transferring sheet including a heat generating layer on one side thereof, said heat generating layer including at least one of a negative thermal sensitivity resistance material which reacts upon heat generated by a laser beam to change the resistance thereof and a photo sensitivity photoconductive material which reacts upon optical intensity of a laser beam to change the resistance thereof and accordingly the current flowing therein, and said image transferring sheet further including a thermal coloring layer on the other side thereof; and
   means, abutting against the heat generating layer, for applying a predetermined voltage to said heat generating layer, and
   wherein the optical intensity of an output laser beam of said laser is modulated according to an image signal to be recorded,
   said laser beam thus modulated is converged to a laser beam having a predetermined beam diameter, which is deflected in a scanning mode at a predetermined speed,
   said laser beam thus converged is applied spot-wise to said heat generating layer so that a laser-beam-irradiated part of said heat generating layer is changed in resistance and accordingly changes the value of current flowing therein, and
   heat is generated in said heat generating layer by said voltage applied thereto, and a thermal coloring material in said thermal coloring layer is transferred onto an image receiving material, thereby forming an image.

2. The image printing system of claim 1, further comprising:
   converging means for converging said laser beam to a single spot for spot-wise application through said heat generation layer by said laser, to said thermal coloring layer, for subsequent image forming.

3. The image printing system of claim 1, wherein said heat generation layer is a negative thermal sensitivity material which reduces it resistance based upon the heat component of the laser beam.

4. The image printing system of claim 1, wherein said heat generating layer is a photosensitive material which reduces its resistance based upon the optical intensity component of the laser beam.

5. The image printing system of claim 2, wherein the converging means is a glass material.

6. The image printing system of claim 2, wherein the thermal coloring layer is a thermal sublimated dye layer for receiving said generated heat and for transferring dye, according to said input image signal modulated by said laser beam, to said image receiving material to thus print a color image.

7. The image printing system of claim 6, wherein the thermal sublimated dye layer includes a yellow, magenta, and cyan layer, collectively utilized to produce said color image.

8. The image printing system of claim 2, further comprising:
   laser generating means for generating said laser beam, and
   laser modulating means, connected to said laser generating means, for modulating said laser beam in accordance with an input image signal.

9. An image printing system for generating an image from an input image signal, modulated by a laser beam, including heat and optical sensitivity components, generated by a lower powered laser, comprising:
   image transformation means, including heat generation means and image forming means, for transforming said image signal, modulated by said laser beam, into a printed image; and
   voltage generation means, abutting said image transformation means, for supplying voltage (v) to said image transformation means;
   said heat generation means receiving said modulated laser beam and decreasing resistance (r) in response to at least one of said heat and optical sensitivity components of said laser beam and thereby increasing power (p) of said laser beam, and generating heat in accordance with said increased power;

said image forming means receiving said modulated laser beam and generated heat and transferring thermal coloring material onto a recording medium to thus form said image.

10. The image printing system of claim 9, further comprising:

laser beam generating means for generating said laser beam; and modulating means, connected to said laser beam generating means, for modulating an input image signal by said laser beam.

11. The image printing system of claim 10, further comprising:

converging means, optically connected to said laser beam generating means, for converging said laser beam to a single spot projected onto said image transformation means.

12. The image printing system of claim 9, wherein the image forming means is a sublimated dye layer.

13. The image printing system of claim 9, wherein the voltage generation means includes a pair of electrodes to supply voltage (v) to said image transformation means and thus power (p) supplied by a laser beam and subsequently heat generated by said forming means is increased in accordance with the equation:

$$p = v^2/r$$

as the resistance (r) of the heat generation means is decreased to thereby allow for utilization of a low powered laser.

14. The image printing system of claim 9, wherein the heat generation means includes a negative thermal sensitivity resistance material which decreases in resistance in response to the heat component of the laser beam.

15. The image printing system of claim 9, wherein the heat generation means includes a photosensitivity photoconductive material which decreases in resistance in response to the optical sensitivity component of the laser beam.

16. The image printing system of claim 11, wherein the converging means is a glass material.

17. An image printing method for generating an image from an input image signal, modulated by a laser beam, including heat and optical sensitivity components, generated by a low powered laser, comprising the steps of:

a) receiving said modulated laser beam and decreasing resistance (r) of an image transformation means in response to at least one of said heat and optical sensitivity components of said laser beam;

b) supplying voltage (v) to said image transformation means;

c) increasing power (p) of said laser beam, said increase in power governed by the equation $p = v^2/r$;

d) generating heat in accordance with said increased power;

e) receiving said modulated laser beam and generated heat and thereafter transferring thermal coloring material onto a recording medium to thus form said image.

18. The image printing method of claim 17, further comprising the step of:

f) converging said laser beam to a single spot projected onto said image transformation means.

* * * * *